(12) United States Patent
Emmons

(10) Patent No.: US 10,024,405 B2
(45) Date of Patent: Jul. 17, 2018

(54) DUAL REDUNDANT LINEAR ACTUATOR

(71) Applicant: Hamilton Sundstrand Corporation, Charlotte, NC (US)

(72) Inventor: Floyd Richard Emmons, West Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 219 days.

(21) Appl. No.: 14/710,067

(22) Filed: May 12, 2015

(65) Prior Publication Data

US 2016/0333993 A1 Nov. 17, 2016

(51) Int. Cl.
*F16H 1/20* (2006.01)
*F16H 25/20* (2006.01)

(52) U.S. Cl.
CPC ... *F16H 25/205* (2013.01); *F16H 2025/2081* (2013.01); *F16H 2025/2087* (2013.01)

(58) Field of Classification Search
CPC ............. F16H 25/205; F16H 25/20; F16H 2025/2081; F16H 2025/2087
See application file for complete search history.

(56) References Cited

U.S. PATENT DOCUMENTS

| | | | |
|---|---|---|---|
| 4,858,491 A * | 8/1989 | Shube | B64C 13/42 192/141 |
| 5,019,755 A * | 5/1991 | Walker | H02K 7/20 310/112 |
| 5,628,234 A | 5/1997 | Crook et al. | |
| 5,957,798 A * | 9/1999 | Smith, III | B64C 13/42 475/5 |
| 6,791,215 B2 | 9/2004 | Tesar | |
| 7,190,096 B2 * | 3/2007 | Blanding | B64C 13/00 310/112 |
| 8,266,976 B2 | 9/2012 | Waide | |
| 8,277,349 B2 * | 10/2012 | Erhart | F16H 3/72 475/2 |
| 8,322,242 B2 * | 12/2012 | Gronli | F16H 25/20 74/89.27 |
| 8,708,124 B2 * | 4/2014 | Morizumi | B60T 1/005 192/219.5 |
| 8,784,246 B2 * | 7/2014 | Treichel | B60K 6/365 475/151 |
| 8,840,507 B2 | 9/2014 | Himmelmann et al. | |
| 2003/0004030 A1 * | 1/2003 | Goo | F16H 3/72 475/332 |
| 2006/0289248 A1 * | 12/2006 | Noh | B60T 13/746 188/2 D |

(Continued)

OTHER PUBLICATIONS

Extended European Search Report for European Application No. 16169408.8 dated Feb. 7, 2017.

*Primary Examiner* — Zakaria Elahmadi
(74) *Attorney, Agent, or Firm* — Carlson, Gaskey & Olds, P.C.

(57) ABSTRACT

A linear actuator includes a planetary gear system including a sun gear, a ring gear, and a planet carrier. A linear output mechanism is coupled to the planetary gear system. A first motor is configured to drive a first input shaft, and the first input shaft is coupled to the planet carrier. A second motor is configured to drive a second input shaft, and the second input shaft is coupled to one of the sun gear and the ring gear.

13 Claims, 2 Drawing Sheets

(56) References Cited

U.S. PATENT DOCUMENTS

| | | | | |
|---|---|---|---|---|
| 2008/0282824 | A1* | 11/2008 | Van Druten | F16H 3/006 74/411.5 |
| 2010/0080704 | A1* | 4/2010 | Serven | F02C 9/58 416/140 |
| 2010/0137092 | A1* | 6/2010 | Weichbold | F16H 47/04 475/31 |
| 2010/0190604 | A1* | 7/2010 | Lawson, Jr. | B60K 6/365 477/70 |
| 2011/0265592 | A1* | 11/2011 | Rossigneux | B21C 47/245 74/411.5 |
| 2012/0015776 | A1* | 1/2012 | Lemmers, Jr. | F01D 21/006 475/271 |
| 2012/0310457 | A1* | 12/2012 | Kim | B60K 6/445 701/22 |
| 2013/0047764 | A1* | 2/2013 | Yamaoka | F16H 19/001 74/411.5 |
| 2013/0255416 | A1* | 10/2013 | Terauchi | B60T 5/00 74/411.5 |
| 2014/0034432 | A1* | 2/2014 | Bull | B60T 13/741 188/106 R |
| 2015/0008057 | A1* | 1/2015 | Lo | B60L 11/12 180/165 |
| 2015/0258985 | A1* | 9/2015 | Kimura | B60W 20/40 701/22 |

* cited by examiner

DUAL REDUNDANT LINEAR ACTUATOR

STATEMENT REGARDING FEDERALLY SPONSORED RESEARCH OR DEVELOPMENT

This invention was made with government support with the United States Navy under Contract No.: N0014-09-0821-0006. The government therefore has certain rights in this invention.

BACKGROUND

This disclosure relates to a linear actuator, and more particularly a linear actuator having dual rotary inputs.

Linear actuators can be used to convert rotary motion into linear displacement. Linear actuators may have failure prone components, failure of which can result in failure in the system as a whole. There are challenges associated with increasing the reliability of linear actuators.

SUMMARY

A linear actuator according to an illustrative embodiment includes a planetary gear system including a sun gear, a ring gear, and a planet carrier. A linear output mechanism is coupled to the planetary gear system. A first motor is configured to drive a first input shaft, and the first input shaft is coupled to the planet carrier. A second motor is configured to drive a second input shaft, and the second input shaft is coupled to one of the sun gear and the ring gear.

An illustrative example method for powering a linear actuator includes providing a first and second motor for driving a planetary gear system, and a linear output coupled to the planetary gear system, selecting one of the first motor or the second motor to provide a rotary input, braking the other of the first motor or the second motor, and driving the planetary gear system with the one of the first motor and the second motor.

An illustrative example method for powering a linear actuator includes providing a first motor and a second motor for driving a planetary gear system, the planetary gear system coupled to a linear output, applying a brake to one of the first motor or the second motor in response to a failure or power loss in the one of the first motor or the second motor, and driving the planetary gear system with the other of the first motor and the second motor The various features and advantages of disclosed embodiments will become apparent to those skilled in the art from the following detailed description. The drawings that accompany the detailed description can be briefly described as follows.

DETAILED DESCRIPTION

Figure 1:
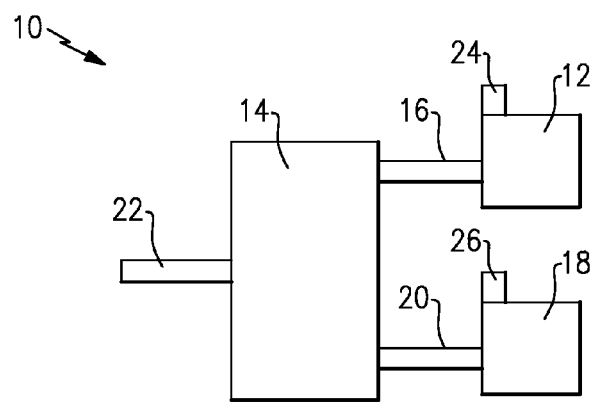
FIG. 1 schematically illustrates a linear actuator with dual input.

FIG. 1 schematically illustrates a dual motor linear actuator 10. The linear actuator 10 includes a first motor 12 coupled to a planetary gear system 14 through a first drive shaft 16. The linear actuator 10 further includes a second motor 18 coupled to the planetary gear system 14 through a second drive shaft 20. The planetary gear system 14 is coupled to a linear output 22, and converts the rotary motion from one or both of first motor 12 and second motor 18 into a linear displacement. A first brake 24 is coupled to the first motor 12, and a second brake 26 is coupled to the second motor 18.

When the second brake 26 is engaged, the first motor 12 provides the sole rotary input, and the planetary gear system 14 and linear output 22 convert the rotary input into a linear displacement. When the first brake 24 is engaged, the second motor 18 provides the sole rotary input, and the planetary gear system 14 and the linear output 22 convert the rotary input into a linear displacement. When neither brake 24, 26 is engaged, both the first motor 12 and the second motor 18 may provide rotary input, the planetary gear system 14 sums the inputs and converts the inputs into linear displacement of linear output 22.

Figure 2:
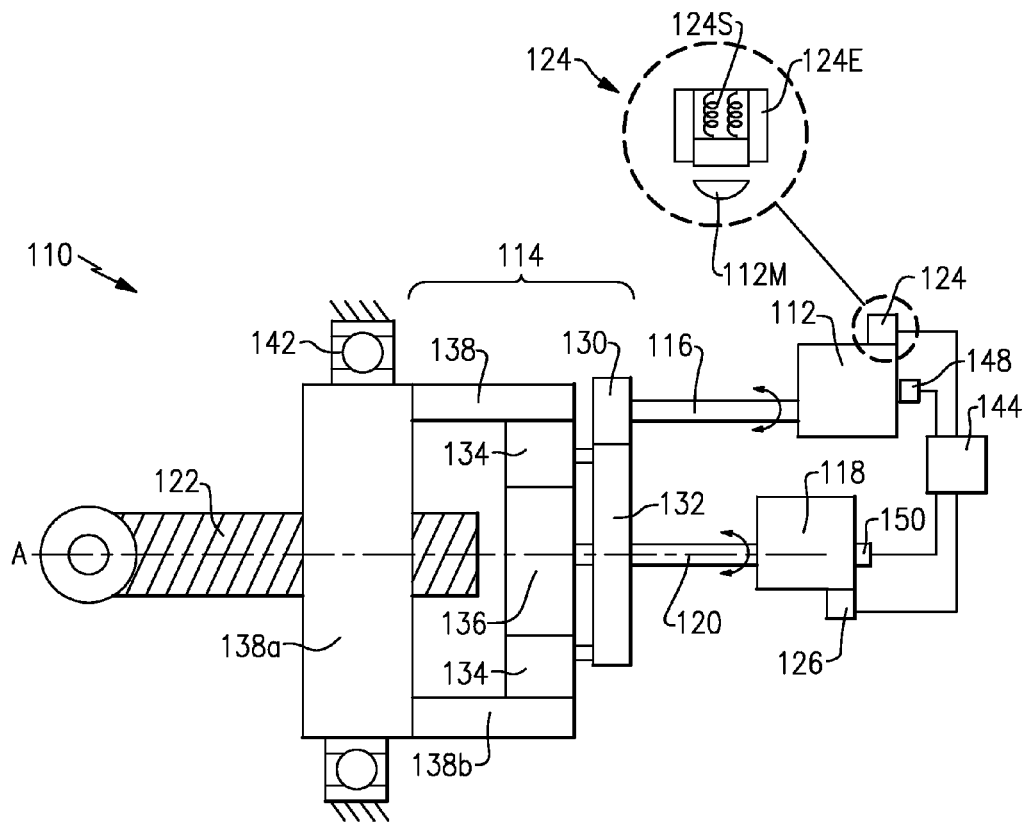
FIG. 2 schematically illustrates a sectional view of a first example dual rotary input linear actuator.

FIG. 2 schematically illustrates a first example dual motor linear actuator 110. The linear actuator 110 includes a first motor 112 for driving a planetary gear system 114 through drive shaft 116, and a second motor 118 for driving the planetary gear system 114 through the second drive shaft 120. The planetary gear system 114 is coupled to a linear output 122, one example being a roller screw. Other linear outputs, including but not limited to lead screws and ball screws, are contemplated. A first brake 124 is coupled to the first motor 112 and a second brake 126 is coupled to the second motor 118.

When the first motor 112 is utilized as the sole input, the second brake 126 is engaged to prevent rotation of the second motor 118. The drive shaft 116 drives the planet carrier 132 through the planet drive gear 130, such that rotation of the drive shaft 116 causes rotation of the planet carrier 132. A plurality of planet gears 134 are attached to the planet carrier 132 and axially spaced therefrom. The plurality of planet gears 134 mesh with a sun gear 136 and a ring gear 138. The ring gear 138 is coupled to the linear output 122. Thus, when the first motor 112 is utilized as the input, the first motor 112 drives the planet carrier 132 through the driveshaft 116 and the planet drive gear 130, causing rotation of the planet gears 134, which in turn rotates the ring gear 138, as the sun gear 136 is held fixed. The sun gear 136 is held fixed because the second brake 126 is engaged, preventing rotation of the second motor 118 and thus fixing the second drive shaft 120. Thus, the linear actuator 110 converts the rotary input of the first motor 112 to linear displacement of the linear output 122.

As an alternative, the second motor 118 may be used as the sole input, and the first brake 124 is engaged to prevent the first motor 112 from rotating and providing input. When the second motor 118 is utilized as an input, the second motor 118 drives the sun gear 136 through the second drive shaft 120. The engaged first brake 124 fixes the first input shaft 116, and in turn fixes the planet carrier 132. Thus, with the planet carrier 132 fixed, rotation of the sun gear 136 resulting from the rotary input of the second motor 118 causes the ring gear 138 to rotate, resulting in linear displacement of the linear output 122. Thus, the linear actuator 110 converts the rotary input of the second motor 118 to linear displacement of the linear output 122.

Because one motor can be used as the sole input, the linear actuator may alternate input motors between uses. Such alternation may even out the wear of the linear actuator and prolong its life. Moreover, the ability to use either of the two motors as the sole input allows for redundancy in case one of the motors fails or loses power. Alternatively, both motors could be used as inputs simultaneously. In that case, the planetary gear system sums the inputs of each motor.

The linear actuator 110 is a compact assembly. The second drive shaft 120, the sun gear 136, the planet carrier 132, the ring gear 138, and the linear output 122 are all rotatable about an axis A. The planet gears 134 are radially outward of the sun gear 136, and the ring gear 138 includes a first section 138a radially outward of the planet gears 134. A second section 138b of the ring gear 138 is axially spaced from the first section 138a and in communication with the linear output 122. The first section 138a and the second section 138b rotate as a single ring gear 138. In one example, the second section 138b of the ring gear 138 radially surrounds a section of the linear output 122. Ball bearings 142 are radially outward of and support the second section 138b of the ring gear 138. The planet carrier 132 is axially spaced from the sun gear 136, and the second drive shaft 120 runs through an opening in the planet carrier 132. The linear output 122 and the ring gear 138 may combine to form a lead screw, ball screw, or roller screw, such that the ring gear 138 is the female component of the linear output 122. This compact assembly allows the linear actuator 110 to be utilized in a variety of applications where linear displacement is desired.

The brakes 124, 126 may be spring loaded 124S into the engaged position, such that a loss of power in the motor 112, 118 causes the respective brake 124, 126 to engage. In one example, a solenoid 124E holds the brake in a disengaged position, and, when the motor loses power, the brake is spring biased into the engaged position, contacting a surface 112M of the motor to brake rotation. This is illustrated schematically. Thus, upon a loss of power in one of the motors 112,118, the brake of that motor will engage, allowing the other motor to be used as the sole input.

A fault detection system 144 (shown schematically) may be in communication with the brakes 124 and 126. The fault detection system 144 is capable of detecting a failure or loss of power in the motors 112, 118 and applying the brake to that motor that has experienced a failure. As one example, a sensor assembly 148 is configured to sense a failure or loss of power in the motor 112, and a sensor assembly 150 is configured to sense a failure or loss of power in the second motor 118. The failure detection system 144 receives signals from the sensor assemblies 148,150, and, if one of the motors 112, 118 fails or loses power, can apply the respective brake 124, 126 to that motor. The other motor may then be used as the sole input.

Figure 3:
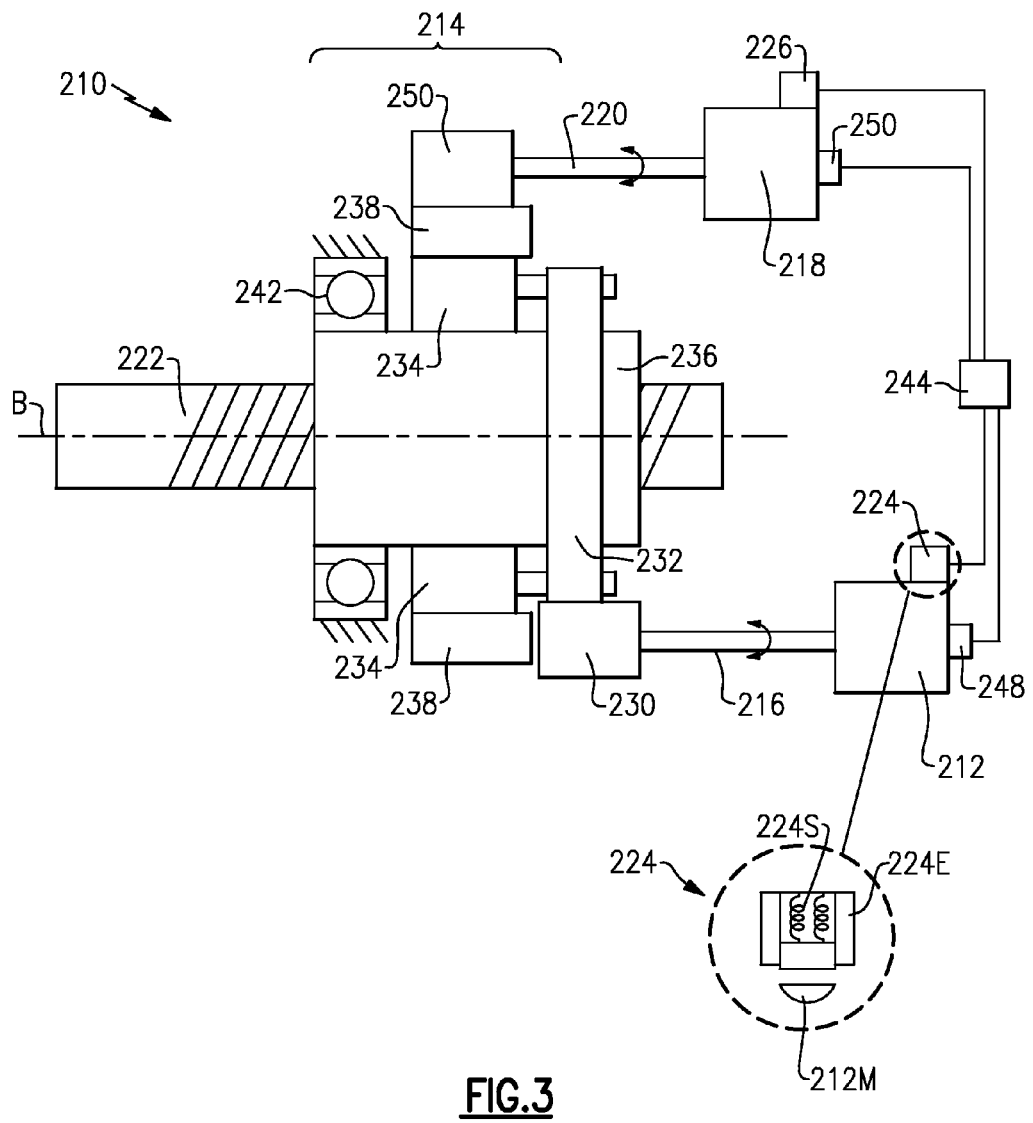
FIG. 3 schematically illustrates a sectional view of a second example dual rotary input linear actuator.

FIG. 3 schematically shows a second example dual redundant linear actuator 210. A linear actuator 210 includes a first motor 212 for driving a planetary gear system 214 through the first drive shaft 216. The linear actuator 210 further includes a second motor 218 for driving planetary gear system 214 through second drive shaft 220. The planetary gear system 214 is coupled to the linear output 222, an example being a roller screw. Other linear outputs, including but not limited to lead screws and ball screws, are contemplated. Thus, a rotary input from first motor 212 and/or second motor 218 is converted into a linear displacement of the linear output 222 through the planetary gear system 214.

A first brake 224 is coupled to the first motor 212, and a second brake 226 is coupled to the second motor 218. When the first motor 212 is utilized as the sole input, the second brake 226 is engaged to prevent rotary input from the second motor 218. Similarly, when the second motor 218 is utilized as the sole input, the first brake 224 is engaged to prevent rotary input from the first motor 212.

When the first motor 212 is utilized as the sole input, it drives the planet carrier 232 through the first drive shaft 216 and the planet gear drive 230. Because the second brake 226 of the second motor 218 is engaged, the second input shaft 220 is held fixed, which in turn holds the ring gear 238 fixed. Thus, rotation of the planet carrier 232 causes rotation of the planet gears 234, which in turn rotate the sun gear 236 because the ring gear 238 is fixed. The sun gear 236 is coupled to the linear output 222, such that rotation of the sun gear 236 results in a linear displacement of the linear output 222.

Alternatively, the second motor 218 may be used as the sole input for the linear actuator 210. In that case, the first brake 224 is engaged to prevent rotation of the first motor 212 and the first drive shaft 216. Rotation of the second motor 218 causes rotary motion in the second drive shaft 220 which in turn rotates the ring gear 238 through the ring gear drive 250. The planet carrier 232 and in turn the planet gears 234 are held fixed because the brake 224 is engaged, preventing rotation of the motor 212 and the input shaft 216. Thus, the resulting rotation of the ring gear 238 rotates the sun gear 236, which in turn rotates the linear output 222, resulting in a linear displacement of the linear output 222.

Because one motor can be used as the sole input, the linear actuator may alternate input motors between uses. Such alternation evens out the wear of the linear actuator and prolongs its life. Moreover, the ability to use either of the two motors as the sole input allows for redundancy in case one of the motors fails or loses power. Alternatively, both motors could be used as inputs simultaneously. In that case, the planetary gear system sums the inputs of each motor.

The linear actuator 210 is a compact assembly. The sun gear 236, the planet carrier 232, the ring gear 238, and the linear output 222 are all rotatable about axis B. The sun gear 236 is engaged with and radially surrounds a section of the linear output 222. Ball bearings 242 are radially outward of and support the sun gear 236. The planet gears 234 mesh with and are radially outward of the sun gear 236. The planet gears 234 are axially spaced from the ball bearings 242. The planet gears 234 are axially spaced from and coupled to the planet carrier 232. The planetary gears 234 are also meshed with and radially inward of the ring gear 238. The planet gear drive 230 is radially outward of the planet carrier 232. The ring gear drive 250 is radially outward of the ring gear 238. The linear output 222 and the ring gear 238 may combine to form a lead screw, ball screw, or roller screw, such that the ring gear 238 is the female component of the linear output 222. This compact assembly allows the linear actuator 210 to be utilized in a variety of applications where linear displacement is desired.

The brakes 224 and 226 may be spring loaded 224S into the engaged position, and a loss of power in the motor 212, 218 will cause the respective brake 224, 226 to engage. In one example, a solenoid 224E holds the brake in a disengaged position, such that, when the motor loses power, the brake is spring biased into the engaged position, contacting a surface 212M of the motor to brake rotation. This is illustrated schematically. Thus, upon a loss of power in one of the motors 212, 218, the brake of that motor will engage, allowing the other motor to be used as the sole input.

A fault detection system 244 (shown schematically) may be in communication with the brakes 224 and 226. The fault detection system 244 is capable of detecting a failure or loss of power in the motors and applying the brake to that motor that has experienced a failure. As one example, a sensor assembly 248 is configured to sense a failure or loss of power in the motor 212, and a sensor assembly 251 is configured to sense a failure or loss of power in the second motor 218. The failure detection system 244 receives signals from the sensor assemblies 248, 251, and, if one of the motors 212, 218 fails or loses power, can apply the respective brake 224, 226 to that motor. The other motor can then be used as the sole input.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

I claim:

1. A linear actuator comprising:
   a planetary gear system including a sun gear, a ring gear, and a planet carrier;
   a linear output mechanism coupled to said planetary gear system;
   a first motor configured to drive a first input shaft, wherein said first input shaft is coupled to said planet carrier; and
   a second motor configured to drive a second input shaft, wherein said second input shaft is coupled to one of said sun gear and said ring gear; and
   a first brake coupled said first motor, wherein said first brake is configured to be spring loaded to an engaged position, such that a loss of power in said first motor applies said brake to said engaged position to said first motor to hold said planet carrier fixed, and, in said engaged position, said second motor is configured to drive said sun gear, and rotation of said sun gear results in rotation of said ring gear for linear displacement of said linear output mechanism.

2. The linear actuator as recited in claim 1, further comprising a second brake coupled to said second motor.

3. The linear actuator as recited in claim 1, wherein said second motor is coupled to said sun gear.

4. The linear actuator as recited in claim 3, wherein said linear output mechanism is coupled to said ring gear.

5. The linear actuator as recited in claim 3, wherein said second input shaft, said sun gear, said planet carrier, said ring gear, and said linear output are all rotatable about a common axis.

6. The linear actuator as recited in claim 3, wherein said planet carrier is axially spaced from said sun gear, and said second input shaft is coupled to said sun gear through an opening in said planet carrier.

7. A method for powering a linear actuator comprising providing a first and second motor for driving a planetary gear system, and a linear output coupled to said planetary gear system, wherein said first motor is coupled to a planet carrier of said planetary gear system; and said second motor is coupled to a sun gear of said planetary gear system;
   selecting one of said first motor or said second motor to provide a rotary input;
   braking the other of said first motor or said second motor; and
   driving said planetary gear system with the one of said first motor and said second motor, wherein said braking holds said planet carrier fixed, such that, when said second motor drives said sun gear, rotation of said gun gear results in rotation of said ring gear, which results in linear displacement of said linear output.

8. The method as recited in claim 7, further comprising:
   detecting a failure or power loss in the other of said first motor or said second motor, wherein said braking is in response to said failure or power loss detection.

9. The linear actuator as recited in claim 1, wherein said ring gear comprises a first section radially outward of a plurality of planet gears and a second section axially spaced from said first section and in communication with said linear output mechanism, wherein said second section radially surrounds a portion of said linear output mechanism.

10. A linear actuator, comprising:
    a planetary gear system including a sun gear, a ring gear, a plurality of planet gears, and a planet carrier;
    a linear output mechanism coupled to said planetary gear system;
    a first motor configured to drive a first input shaft, wherein said first input shaft is coupled to said planet carrier;
    a second motor configured to drive a second input shaft, wherein said second input shaft is coupled to said sun gear, and wherein said ring gear comprises a first section radially outward of said plurality of planet gears and a second section axially spaced from said first section and in communication with said linear output mechanism, wherein said second section radially surrounds a portion of said linear output mechanism; and
    a first brake coupled to said first motor to hold said planet carrier fixed when in an engaged position, wherein, in said engaged position, said second motor is configured to drive said sun gear, and rotation of said sun gear results in rotation of said ring gear for linear displacement of said linear output mechanism.

11. The linear actuator as recited in claim 10, wherein said second drive shaft, said sun gear, said planet carrier, said ring gear, and said linear output are all rotatable about a common axis.

12. The linear actuator as recited in claim 11, wherein said planet carrier is axially spaced from said sun gear, and said second input shaft is coupled to said sun gear through an opening in said planet carrier.

13. The linear actuator as recited in claim 10, wherein said first input shaft is coupled to and drives said planet carrier through a planet drive gear radially outward of said planet carrier.

* * * * *